(12) United States Patent
Badenoch

(10) Patent No.: US 6,411,876 B1
(45) Date of Patent: Jun. 25, 2002

(54) REAR STEERING CONTROL WITH LONGITUDINAL SHIFT IN ACKERMAN CENTER

(75) Inventor: Scott Wilson Badenoch, Farmington Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/945,561

(22) Filed: Aug. 31, 2001

Related U.S. Application Data
(60) Provisional application No. 60/229,921, filed on Sep. 1, 2000.

(51) Int. Cl.[7] .................................................. B62D 5/06
(52) U.S. Cl. ..................... 701/41; 180/140; 180/408; 280/91
(58) Field of Search ............................ 701/41; 180/415, 180/408, 421, 140, 410, 437; 280/91, 86.758, 93.51, 5.522; 74/586

(56) References Cited

U.S. PATENT DOCUMENTS

| | | | | |
|---|---|---|---|---|
| 5,014,802 A | * | 5/1991 | Knoll et al. ................ | 180/408 |
| 5,097,917 A | * | 3/1992 | Serizawa et al. ........... | 180/402 |
| 5,379,220 A | * | 1/1995 | Allen et al. ................. | 701/41 |
| 5,732,371 A | * | 3/1998 | Fujita ........................... | 701/38 |
| 6,283,483 B1 | * | 9/2001 | Johnson et al. .......... | 280/5.522 |

* cited by examiner

Primary Examiner—William A. Cuchlinski, Jr.
Assistant Examiner—Marthe Y. Marc-Coleman
(74) Attorney, Agent, or Firm—Robert M. Sigler

(57) ABSTRACT

A rear wheel steering control determines, when desired and actual lateral accelerations of a vehicle have the same direction, an instantaneous dynamic yaw center on a vehicle longitudinal axis in response to the measured vehicle speed. It further determines a cornering radius and an instantaneous Ackerman center as a point at the outer end of the cornering radius extended outward perpendicular to the vehicle longitudinal axis from the instantaneous Ackerman center. The control then directs a rear wheel of the vehicle to be perpendicular to a line connecting the instantaneous Ackerman center to the center of the wheel. The dynamic yaw center, and thus the instantaneous Ackerman center, is preferably shifted rearward with increasing vehicle speed to shift vehicle steering in a direction from oversteer at very low speeds for greater ease of steering in parking maneuvers to understeer for vehicle stability in high speed driving conditions. The method and apparatus preferably include a reverse lock routine to control the rear wheels when the desired and actual lateral accelerations of the vehicle have opposing directions, to control the vehicle in a four wheel drift; and the reverse lock routine may further adjust suspension damping.

7 Claims, 3 Drawing Sheets

REAR STEERING CONTROL WITH LONGITUDINAL SHIFT IN ACKERMAN CENTER

RELATED APPLICATION

This application references U.S. Provisional Application No. 60/229,921, filed Sep. 1, 2000 and incorporates by reference that portion of the disclosure therein which is relevant.

TECHNICAL FIELD

The technical field of this invention is the control of rear wheel steer angle in vehicles.

BACKGROUND OF THE INVENTION

All motor vehicles are provided with steering gear responsive to driver input and/or other inputs to turn selected wheels of the vehicle for the purpose of changing vehicle direction. Historically, the selected wheels have generally been the front wheels, particularly for passenger vehicles capable of a wide range of forward speeds. Recently, interest is growing in the use of rear wheel steering to complement front wheel steering and extend the range of control of vehicle dynamics at widely different vehicle speeds. For example, desired vehicle steering characteristics are very different in low speed parking situations than in high speed highway cruising or performance driving. Since most drivers are accustomed to the behavior of vehicles having front wheel steer, vehicles with front and rear wheel steer generally provide direct driver control of the front wheel steering angle while the control automatically directs the rear wheels in a predetermined manner to complement the front wheel direction. This invention is primarily concerned with a method and apparatus for providing such rear steer control.

SUMMARY OF THE INVENTION

The method and apparatus of this invention determine, when desired and actual lateral accelerations of the vehicle have the same direction, an instantaneous dynamic yaw center on a vehicle longitudinal axis in response to the measured vehicle speed and a cornering radius. They further determine a rear wheel steering angle corresponding to a wheel direction perpendicular to a straight line connecting the center of the rear wheel to an instantaneous Ackerman center defined at a distance of the cornering radius from the dynamic yaw center in a direction perpendicular to the vehicle central longitudinal axis and direct a rear wheel of the vehicle to be perpendicular to a line connecting the instantaneous Ackerman center to the center of the wheel. The dynamic yaw center, and thus the instantaneous Ackerman center, is preferably shifted rearward with increasing vehicle speed in order to shift vehicle steering in a direction from oversteer at very low speeds for greater ease of steering in parking maneuvers to understeer for vehicle stability in high speed driving conditions. The method and apparatus preferably include a reverse lock routine to control the rear wheels when the desired and actual lateral accelerations of the vehicle have opposing directions, to control the vehicle in a four wheel drift; and the reverse lock routine may also control suspension dampers to further optimize steering characteristics.

DESCRIPTION OF THE PREFERRED EMBODIMENT

Figure 1:
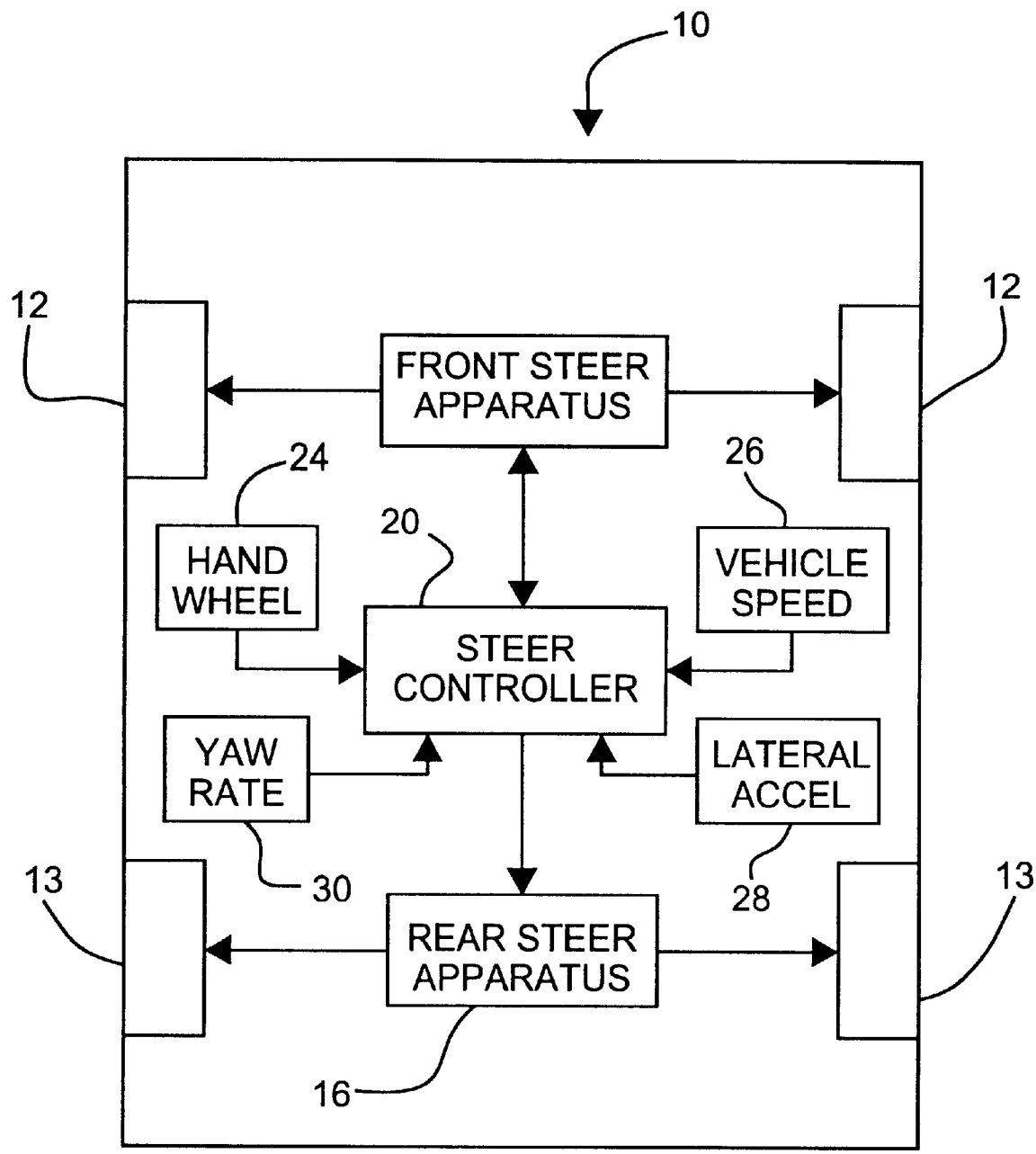
FIG. 1 is a schematic diagram of a vehicle having a rear steer control according to the invention.

Referring to FIG. 1, a vehicle 10 has a body 11 supported on left and right front wheels 12 and left and right rear wheels 13. A front steer apparatus controls the steer angles of the front wheels 12 and a rear steer apparatus 16 controls the steer angles of the rear wheels 13. A steer controller 20 controls the front steer apparatus 14 and the rear steer apparatus 16 in response to a driver operated hand wheel 24, a vehicle speed sensor 26, a lateral acceleration sensor 28 and a yaw rate control 30. Yaw rate control 30, examples of which are in use on production vehicles and are otherwise well known in the art, generally provide apparatus for calculating a desired yaw rate from measured vehicle characteristics and a yaw rate sensor for measuring actual yaw rate and further provide braking control at selected individual wheels to reduce yaw rate error in close loop control.

Steer controller 20 preferably comprises a digital computer based controller having a memory-stored routine for reading sensor and other inputs and issuing output commands to the steer apparatus. The operation of front steer apparatus 14 is known in the art and may include an electric motor controlling a steering rack or individual steering actuators for the two front wheels. Suitable electric power steering apparatus is well known in the art. Alternatively, front steer apparatus could comprise a rack and pinion steering system mechanically controlled by hand wheel 24; but in this case hand wheel 24 may still provide a position signal to steer controller 20. The basic purpose of the apparatus of this invention is to control the steer angle of the rear wheels through steer controller 20 and rear steer apparatus 16 in vehicle operation.

Figure 2:
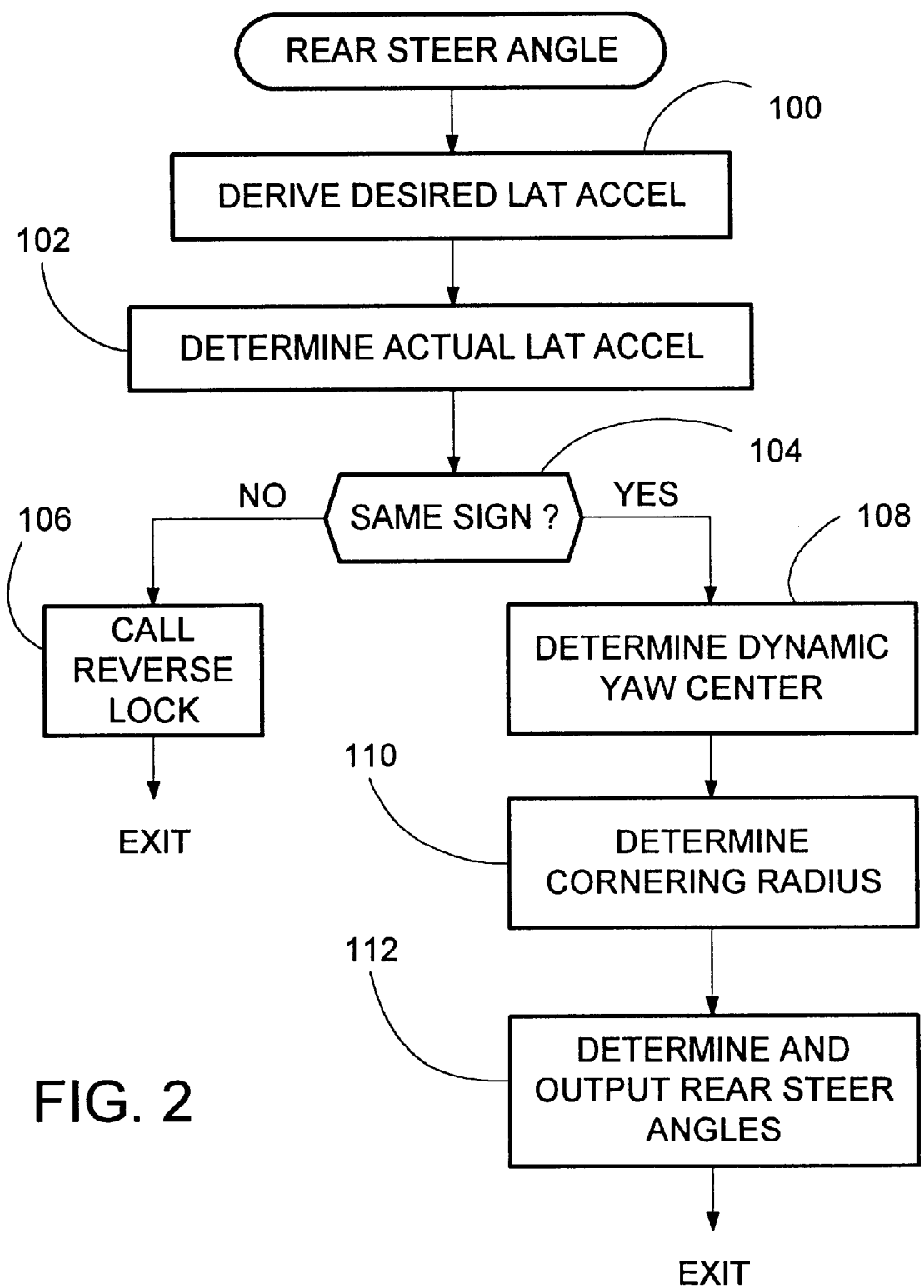
FIGS. 2 and 3 are flow charts illustrating the operation of the invention.

The operation of the system is illustrated by routine REAR STEER ANGLE, which is described with reference to the flow chart of FIG. 2. The routine begins at step 100 by deriving a desired lateral acceleration DESIRED LAT ACCEL. This can generally be obtained from yaw rate control 30, since many such controls include a desired lateral acceleration determination; or it may be separately derived as a function of desired front steering angle as measured by a steering angle sensor associated with hand wheel 24, as well as a function of vehicle speed. Methods for deriving a desired lateral acceleration for a set of vehicle dynamic parameters are known in the art. The routine then reads the actual lateral acceleration ACTUAL LAT ACCEL at step 102 from a lateral acceleration sensor mounted at or near the center of mass of the vehicle.

If the values of desired and actual lateral acceleration have the same sign, indicating that their vectors have the same direction (left or right relative to vehicle longitudinal direction) as determined at a step 104, the routine determines at step 108 a dynamic yaw center, which is located along the central longitudinal axis of the vehicle, which is the longitudinal axis passing through (in two dimensions) the vehicle center of mass. The dynamic yaw center is located near the vehicle front axle at low vehicle speeds and moves rearward as vehicle speed increases and may well move behind the vehicle on the extended axis line. Values of dynamic yaw center position for a vehicle may be stored in a lookup table as a function of sensed vehicle speed; or a representative equation may be stored by which the longitudinal location of the dynamic yaw center may be calculated using the measured value of vehicle speed. In either case, the values or coefficients of the equation are preferably determined by calibration.

Next, at step 110, the cornering radius $R_c$ of the vehicle is derived from a look-up table based on vehicle speed and lateral acceleration or according to the following equation:

$$R_c = mV^2/Ay,$$

where m is the mass of the vehicle, V is the vehicle speed and Ay is the lateral acceleration. Once the dynamic yaw center and cornering radius have been determined, the instantaneous Ackerman center is defined at a distance of the cornering radius from the dynamic yaw center in a direction perpendicular to the vehicle central longitudinal axis. The steering angles for the rear wheels may then be derived at step 112 so that they are each directed perpendicularly to a line directed from the center of the wheel to the instantaneous Ackerman center; and appropriate commands are then issued to the rear steer apparatus.

Figure 3:
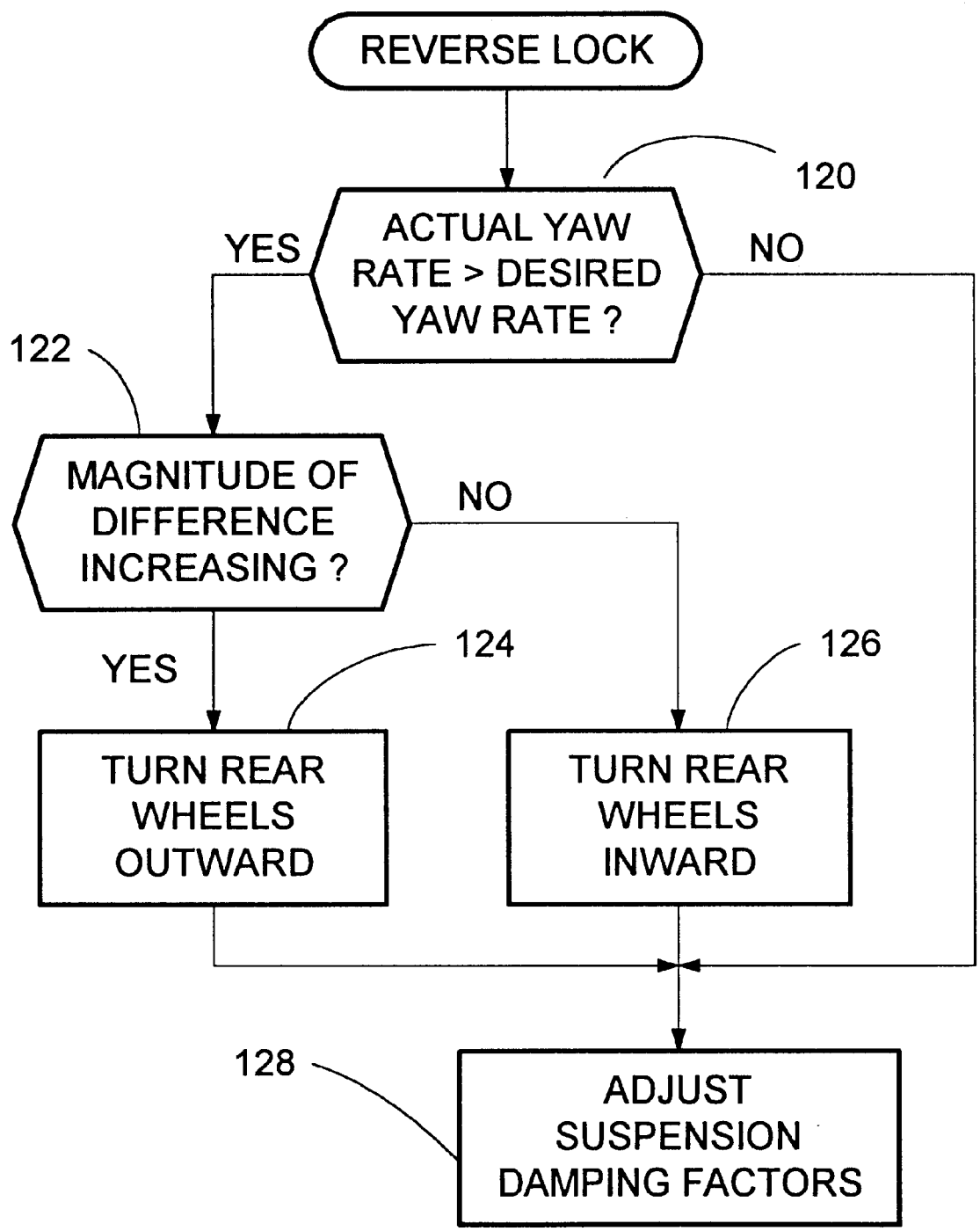

Returning to step 104, if the desired and actual lateral accelerations do not have the same sign, a subroutine REVERSE LOCK is called. This subroutine is described by the flow chart of FIG. 3. It begins at step 120 by determining if the actual yaw rate exceeds the desired yaw rate. If the actual yaw rate is greater, the subroutine proceeds to step 122, where it determines if magnitude of the difference between the desired and actual yaw rates is increasing. If the magnitude is increasing, the rear wheels are turned outward at step 124 (toward the direction of translational vehicle movement) at a predetermined rate (e.g. 10 degrees per second) until they reach their maximum steering angle. If, at step 122, the magnitude is found to be decreasing, the rear wheels are turned inward at step 126 (toward the vehicle longitudinal axis) at a predetermined rate (e.g. 10 degrees per second) until they reach the straight ahead (relative to the vehicle longitudinal axis) position.

From either of steps 124 and 126, if the vehicle is also provided with a suspension damper control capable of providing separate control of damping factor in compression and rebound, the subroutine may proceed to step 128, in which the damping factors of the suspension dampers associated with front wheels 12 are increased in compression and the damping factors of the suspension dampers associated with the rear wheels 13 are increased in rebound. Each increase is derived from calibrated values in a look-up table that vary with the magnitude of the difference between the actual and desired yaw rates. By increasing these damping factors as the vehicle swings into a drift, the vehicle dynamics will be shifted toward understeer, thus combating reverse lock drift. As reverse lock decreases, the damping increase will be reduced, moving the car toward neutral steer.

As an additional feature, the vehicle steering system may be provided with a steering stop setting algorithm, which includes a driver feedback of tactile response artificially generated in the steering effort to help the driver identify the optimum angle of attack of the tire during cornering and to help the driver positively know when additional tire attack will be detrimental to safe cornering. This algorithm assumes that individual tire slip angle can be measured directly, indirectly or computed. Alternatively, since the vehicle speed is known and the lateral acceleration is known both through computation of steering angle at a speed and through measurement of an instrument (lateral accelerometer), maximum bound of steering angle can be computed (tire steer angle at the point of maximum bounds is equal to the tire steer angle where a maximum steady-state lateral acceleration (e.g. 0.85 g force) plus 10 degrees. At this point turning the wheel any more cannot be beneficial. By either method (slip angle measured or computed or by computation of maximum slip angle plus ten degrees), a positive "stop" or increase in steering feel (effort) can be programmed into the steering wheel. So the driver has more difficulty turning the wheel beyond a point at which the tires are skidding more and rolling less, such point being defined by the characteristic of the tire at an expected loading for the vehicle. This point is a "hard" stop, or a high effort to steer further stop. A "soft stop can be programmed in at a slip angle of 4 degrees, giving the driver a tactile feedback that the optimum slip angle for peak cornering force (performance) has been reached. The effort at the soft stop would increase, but less than the increase for the hard stop.

The algorithm is described as follows:

(1) Set stop 1 (a "soft stop" or steering effort increase felt through the steering wheel by the driver) at the steering wheel angle where the maximum lateral acceleration possible in the vehicle (as established by empirical measurement and the road surface coefficient of friction estimation from the ABS algorithm) equals the desired lateral acceleration plus a constant angle (estimated to be 4 degrees of slip angle at the tire—actual angle may vary slightly based on tire data).

(2) Set stop 2 (a "hard stop" or steering effort increase felt through the steering wheel by the driver) at the steering wheel angle where the maximum lateral acceleration possible in the vehicle (as established by empirical measurement and the road surface coefficient of friction estimation from the ABS algorithm) equals the desired lateral acceleration plus a constant angle (estimated to be 10 degrees of slip angle at the tire—actual angle may vary slightly based on tire data).

What is claimed is:

1. A method of determining a steering angle for a rear wheel in a vehicle steering system comprising the steps:

measuring vehicle speed;

deriving a desired lateral acceleration;

measuring an actual lateral acceleration;

if the derived desired lateral acceleration and the measured actual lateral acceleration are in the same direction, (a) determining a dynamic yaw center on a vehicle longitudinal axis in response to the measured vehicle speed, (b) determining a cornering radius, (c) determining a rear wheel steering angle corresponding to a wheel direction perpendicular to a straight line connecting the center of the rear wheel to an instantaneous Ackerman center defined at a distance of the cornering radius from the dynamic yaw center in a direction perpendicular to the vehicle longitudinal axis.

2. The method of claim 1 wherein the dynamic yaw center, and thus the instantaneous Ackerman center, is shifted rearward along the vehicle central longitudinal axis with increasing vehicle speed.

3. The method of claim 1 further comprising the steps, when the desired lateral acceleration and the actual lateral acceleration do not have the same direction, of:

determining a desired yaw rate of the vehicle;

determining an actual yaw rate of the vehicle;

while the actual yaw rate exceeds the desired yaw rate, increasing the steer angle of the rear wheel when a magnitude of a difference between the actual yaw rate and the desired yaw rate is increasing and decreasing the steer angle of the rear wheel when a magnitude of a difference between the actual yaw rate and the desired yaw rate is decreasing.

4. A rear wheel steering control for a vehicle comprising:

a vehicle speed sensor providing a measured vehicle speed signal;

means for deriving a desired lateral acceleration;

a lateral acceleration sensor providing a measured actual lateral acceleration signal; and means for, when the derived desired lateral acceleration and the measured actual lateral acceleration signal are in the same direction,
  (a) determining a dynamic yaw center on a vehicle longitudinal axis in response to the measured vehicle speed signal,
  (b) determining a cornering radius,
  (c) determining a rear wheel steering angle corresponding to a wheel direction perpendicular to a straight line connecting the center of the rear wheel to an instantaneous Ackerman center defined at a distance of the cornering radius from the dynamic yaw center in a direction perpendicular to the vehicle central longitudinal axis.

5. The rear wheel steering control of claim 4 wherein the dynamic yaw center, and thus the instantaneous Ackerman center, is shifted rearward along the vehicle central longitudinal axis with increasing vehicle speed.

6. The rear wheel steering control of claim 4 further comprising means for, when the desired lateral acceleration and the actual lateral acceleration do not have the same direction:

determining a desired yaw rate of the vehicle;

determining an actual yaw rate of the vehicle;

while the actual yaw rate exceeds the desired yaw rate, increasing the steer angle of the rear wheel when a magnitude of a difference between the actual yaw rate and the desired yaw rate is increasing and decreasing the steer angle of the rear wheel when a magnitude of a difference between the actual yaw rate and the desired yaw rate is decreasing.

7. The rear wheel steering control of claim 6, for a vehicle also having front wheels, further comprising:

suspension dampers associated with the front wheels and the rear wheels; and means for, when the desired lateral acceleration and the actual lateral acceleration do not have the same direction, increasing damping in compression of the suspension dampers associated with the front wheels and increasing damping in rebound of the suspension dampers associated with the rear wheels.

* * * * *